United States Patent [19]

Thomas

[11] Patent Number: 4,505,361
[45] Date of Patent: Mar. 19, 1985

[54] ANTI-CHATTER ASSEMBLY

[76] Inventor: Earl M. Thomas, 10344 118th St. N., Largo, Fla. 33544

[21] Appl. No.: 453,525

[22] Filed: Dec. 27, 1982

[51] Int. Cl.³ .............................................. F16D 55/22
[52] U.S. Cl. .................................... 188/26; 188/73.35; 188/73.45
[58] Field of Search ......... 188/18 A, 26, 73.31–73.39, 188/73.41–73.47, 205 A, 344

[56] References Cited

U.S. PATENT DOCUMENTS

| | | | |
|---|---|---|---|
| 3,976,169 | 8/1976 | Ogawa | 188/73.39 |
| 3,977,498 | 8/1976 | Ogawa | 188/73.45 |
| 4,022,297 | 5/1977 | Haraikawa | 188/26 |
| 4,034,858 | 7/1977 | Rath | 188/73.39 |
| 4,215,768 | 8/1980 | Seki | 188/26 |
| 4,321,984 | 3/1982 | Burgdorf et al. | 188/73.43 |

FOREIGN PATENT DOCUMENTS

| | | | |
|---|---|---|---|
| 1358613 | 3/1964 | France | 188/73.43 |
| 1431782 | 2/1966 | France | 188/73.47 |
| 1250888 | 10/1971 | United Kingdom | 188/73.47 |

Primary Examiner—Douglas C. Butler
Assistant Examiner—R. R. Diefendorf
Attorney, Agent, or Firm—Ronald E. Smith

[57] ABSTRACT

An assembly designed to eliminate or attenuate undesirable noises generated by conventional disc brake assemblies when the mounting members for such assemblies become worn with usage. A bias member under compression is disposed in sandwiched relation between a pair of retainer members, one of which is fixedly secured to the fork portion of a motorcycle, and the other of which is fixedly secured to the housing for the braking unit. Thus, the bias member urges such caliper forwardly at all times. Such forward pressure causes the brake caliper mounting pins to seat firmly against the bore formed by the pin guides which are a part of the bracket upon which the caliper is mounted. Although the diameter of such bore will continue to increase attendant operation of the motorcycle, the operation of the compressed bias member will continually accommodate the increased tolerances between the bore and the caliper mounting pins.

1 Claim, 7 Drawing Figures

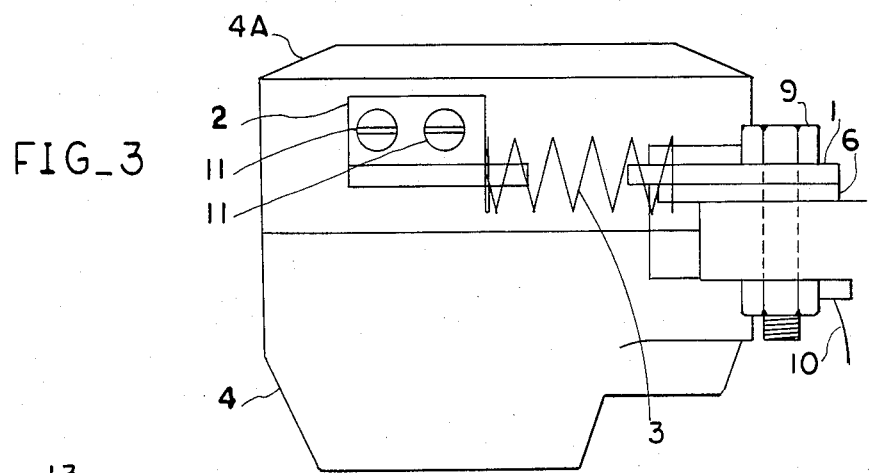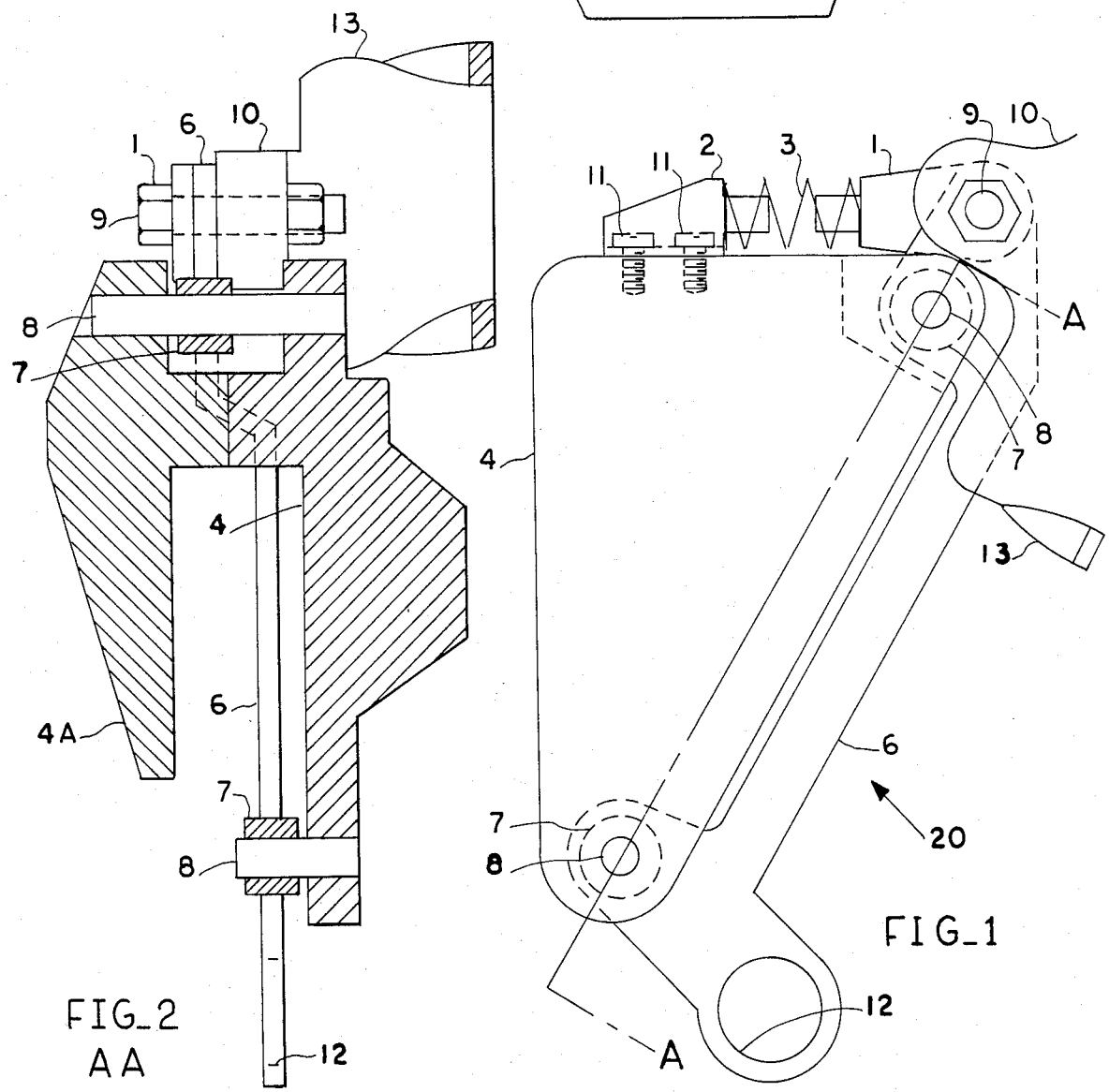

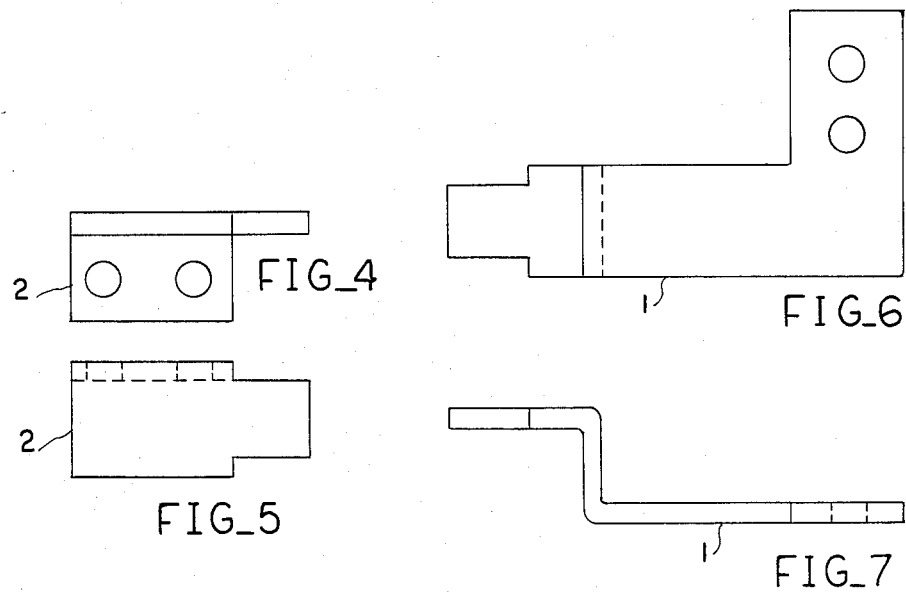

ANTI-CHATTER ASSEMBLY

BACKGROUND OF THE INVENTION

1. Field of the Invention

This invention relates generally to disc brake anti-rattle or anti-chatter devices, and more specifically relates to such a device designed to eliminate or attenuate such noises at their source.

2. Description of the Prior Art

A search of U.S. patents that was conducted prior to the filing of this disclosure located the following patents: Soltis, Jr., U.S. Pat. No. 3,463,275, date of issue 08-26-69, Girauldon, U.S. Pat. No. 3,616,878, date of issue 11-02-71, Courbot, U.S. Pat. No. 3,880,261, date of issue 04-29-75, Haraikawa, U.S. Pat. No. 3,935,927, date of issue 02-03-76, Luepertz, U.S. Pat. No. 4,189,190, date of issue 02-19-80.

Earlier attempts to attenuate disc brake caliper chatter have, in effect, treated the symptoms of the chatter and not the source thereof. More specifically, the prior art shows assemblies designed primarily to prevent the friction pads from rattling inside the caliper. Although the friction pads do indeed cause a rattling noise in worn brake assemblies, the elimination of such friction pad rattle does not attack the source of the problem.

In all motorcycle disc brake assemblies, the brake housing, or caliper, is mounted on a mounting bracket that can assume differing sizes and shapes. In each case, however, the caliper itself is mounted to the bracket by an assembly that includes a pair of bored boss members formed on the mounting bracket in vertically spaced relation to one another, which boss members receive the mounting pins upon which the caliper is mounted. With use, the diameter of the bores defined by such mounting bracket boss members will increase, and the guide pins disposed therein will accordingly begin to move about therein responsive to mounting bracket movement. The mounting bracket will move, of course, because it is mounted to a fork of the vehicle at one end and to an axle of the vehicle at the other end. As the diameter of the bores formed in the respective boss members increases, the unpleasant chattering noise increases.

Many motorcycle owners have heretofore been required to purchase new caliper assemblies to eliminate the chatter. Not only are the new assemblies expensive, but in view of the teachings of this disclosure, such caliper replacement is no longer necessary. The assembly disclosed hereinafter enables the caliper mounting pins and the ever enlarging bore portions of the respective boss means to remain in non-rattling disposition relative to one another regardless of the amount of wear thereon.

SUMMARY OF THE INVENTION

The longstanding but heretofore unfulfilled need for a disc brake anti-chatter device is now provided in the form of a three-part assembly that urges the caliper mounting pins to seat quietly within their respective pin guides, even when such pin guides are severely worn. The three part assembly includes a first and second spring retainer means, and a compression spring. The retainer means may assume a variety of configurations and dimensions, because different vehicles are, of course, constructed differently. In all cases, however, the purpose of the spring retainer means is to provide a means whereby the compression spring disposed therebetween can be harnessed to maintain the caliper mounting pins in seated relation to their respective pin guides even when the bores formed by such pin guides have become enlarged.

It is therefore seen that the primary object of this invention is to eliminate or attenuate the unpleasant chattering sound that occurs in disc brakes that have become worn with the passage of time.

A more specific object of this invention is to eliminate such unpleasant chattering sound at their source.

Another very important object is to provide an anti-chattering means that not only eliminates or substantially reduces such chattering when first installed, but that will also continue to eliminate such chattering even when the disc brake assembly has deteriorated even more subsequent to the installation of the anti-chatter device of this invention.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a side elevational view of a typical motorcycle brake caliper and its mounting bracket, showing how one form of the inventive assembly is affixed thereto.

FIG. 2 is a front view of the assembly shown in FIG. 1, taken along line A—A of FIG. 1.

FIG. 3 is a top plan view of the assembly shown in FIG. 1.

FIGS. 4–7 show some of the other forms that the inventive assembly may take, such form varying with the specific construction of the vehicle with which the inventive assembly is used.

DETAILED DESCRIPTION OF THE PREFERRED EMBODIMENT

Referring now to FIG. 1, it will there be seen that one form of the inventive assembly is shown mounted on a conventional caliper-mounting bracket assembly which is designated as a whole by the reference numeral 20. The inventive assembly includes a first spring retainer means 1, a second spring retainer means 2, and a suitable bias means such as a coil spring 3 disposed in sandwiched relation therebetween. As observable from an inspection of FIGS. 1 and 3, the spring retainer means 1 and 2 are mounted so that their respective shoulder portions are in longitudinal alignment with one another so that the longitudinal axis of symmetry of the bias means 3 is parallel to the longitudinal axis of symmetry of the brake housing 4.

The brake housing 4 includes an outer unit that houses the friction pad (not shown) and the hydraulic unit, etc. (not shown) and the caliper inner unit 4A. The caliper outer and inner units, 4, 4A respectively, are conventionally secured to one another by bolt members which are not shown to simplify the drawings. The caliper will hereinafter be referred to by the reference numeral 4 which will be understood to include parts 4 and 4A. The caliper 4 is mounted to a caliper mounting bracket 6, as best shown in FIGS. 1 and 2. In a typical installation, the mounting bracket 6 will be provided with a pair of vertically spaced boss members, collectively designated 7, each of which boss members define a bore means. As best shown in FIG. 2, the respective bore means slidably receive mounting pins collectively designated 8. When a motorcycle is new, the pin 8 will fit snugly within their respective bores defined by the boss member 7, and the disc brakes will operate quietly. As the vehicle ages, however, the pins 8 will act against their respective bores, thereby enlarging them on a progressive basis. As the bore diameter increases, the mounting pins 8 begin to move about within such bores, and it is this movement which creates the chattering noise which has heretofore driven motorcycle owners to purchase new brake assemblies.

The guide pins 8 will move about within their respective bores, because the caliper 4 of course moves conjointly with its mounting bracket 6. Typically, caliper mounting brackets have one end mounted to the fork portion of the vehicle, and the other end mounted to an axle which rotatably mounts the wheel of the vehicle. Since the fork and wheel axle continually move relative to one another as the vehicle travels across a road surface, the act of replacing a worn disc brake assembly with a new one merely restarts the bore enlargement process anew.

In the drawings, a portion of a typical fork leg is designated 13, and a lug 10 is shown projecting therefrom. The lug 10 is bored to receive a bolt and nut means 9 that collectively retain the first spring retainer means 1 against the mounting bracket 6, as perhaps best shown in FIG. 2.

The second spring retainer means 2 is secured to the inner caliper unit 4A, as shown in FIG. 3, by fastener means 11. Since the first spring retainer means 1 is fixedly secured to the mounting bracket 6, which in turn is fixedly secured to the fork portion 13 of the vehicle, it is clear that the spring retainer means 1 essentially provides a base means for the inventive assembly. More specifically, the spring retainer means 2, as shown, is fixedly secured to the caliper inner unit 4A which unit is free to move when the bores formed in the respective boss member 7 becomes enlarged as aforesaid. Thus, the function of the bias means 3 is to continually urge the spring retainer means 2 in a forward direction. Since the caliper units 4 and 4A are fixedly secured to one another as aforesaid, the forward urging of inner caliper unit 4A of course effects a forward urging of the outer caliper unit 4. In this manner, the mounting pins 8 are likewise urged forwardly to seat against the forward portion of the respective enlarged bores. As the bores continue to enlarge, the bias means 3 will continue to expand, thereby continually accommodating the increased bore diameter.

The novel assembly will not only eliminate or substantially reduce the chatter associated with worn disc brake assemblies, but it will also greatly decrease the rate of bore enlargement or assembly deterioration. Thus, if the inventive assembly is installed on a new caliper, the relative movement between the guide pins 8 and their boss members 7 will be substantially eliminated from the beginning, so that the wearing process cannot even begin.

The inventive assembly can be provided as original equipment by the vehicle manufacturer, or can be provided in kit form for retrofit applications. In the latter case, the inventive assembly can be installed on existing calipers withou affecting the structural integrity of the same.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, that which is claimed is:

1. A disc brake anti-rattle assembly, comprising,
   a bias means,
   a first retainer means disposed in supporting relation to a first end of said bias means,
   said first retainer means fixedly secured to a fork portion of a two-wheel vehicle, exteriorly thereof,
   a second retainer means disposed in compression-inducing relation to a second end of said bias means,
   a caliper means,
   said second retainer means fixedly secured to said caliper means, exteriorly thereof,
   a mounting bracket to which said caliper means is mounted,
   said caliper means and said mounting bracket provided with an upper and lower pair of first and second axially aligned bore means,
   a first mounting pin that extends through both of said upper axially aligned bore means to unite the upper portion of said caliper and the upper portion of said mounting bracket,
   said upper portion of said bracket mounted to the fork portion of the two-wheel vehicle,
   a second mounting pin that extends through both of said lower axially aligned bore means to unite the lower portion of said caliper and the lower portion of said mounting bracket,
   said lower portion of said bracket mounted to an axle or lower fork portion of said two-wheel vehicle,
   a rotatable disc that forms a part of the disc brake assembly,
   said first and second mounting pins disposed parallel to the axis of rotation of said rotatable disc,
   said bias means disposed perpendicular to said first and second mounting pins so that said first and second mounting pins are urged to bear against their respective bores even when said bores have become enlarged as a result of wear,
   said bias means specifically positioned relative to said first and second mounting pins to act thereupon through a lever arm in a pivotal direction,
   said bias means urging said caliper means and hence said first and second mounting pins in the direction of forward travel of said vehicle so that activation of said disc brake assembly complements the activation of said bias means,
   said external mounting of said bias means and said first and second retainer means permitting said anti-rattle assembly to be retrofit onto conventional disc brake assemblies,
   and the amount of rattle-causing wear induced by frictional engagement between said first and second mounting pins and their respective bore means limited only by the functional length of said bias means.

* * * * *